DEBITTERING DRIED PEAS

George T. Austin and Helen F. Austin, Pullman, Wash., assignors to Washington State University Research Foundation, Pullman, Wash.
No Drawing. Filed Aug. 1, 1963, Ser. No. 299,433
6 Claims. (Cl. 99—98)

This invention relates to the treatment of dried peas to make them palatable.

Raw dry peas (*Pisum sativum* L.) taste bitter and are impalatable without debittering. Pea flour is too bitter to use in food preparations that do not require long moist cooking. The preparation of split pea soup is an example. Here the peas are boiled in water for a substantial time.

It is the purpose of the present invention to provide a simple effective way of debittering peas so that the resulting dry product can be used without the effects of the bitter substance that the raw dry peas contain.

More particularly it is a purpose of the invention to debitter green peas in such a manner as to substantially retain the color and still remove the bitterness.

Another purpose of the invention is to provide a method whereby raw dry peas may be debittered with a minimum of protein denaturation and minimum addition of water so that the treated peas may be ground into flour without drying.

The nature and advantages of the invention will be made more clear in the following description of a preferred method.

The preferred method that has been employed is to support the peas in an autoclave in the presence of water but out of contact therewith. The temperature in the autoclave is then raised to create steam and this steam is exhausted through a vent until the air in the autoclave is purged. The vent is then closed. This takes about ten minutes. Then pressure is raised slowly to the desired point (taking approximately ten minutes) and held at this point for a predetermined time. The peas are agitated during the deaerating and the succeeding periods. A slow stirring is adequate and it may be done by any suitable means such as a conventional paddle type agitator. After about 10 minutes at about 8–10 pounds per square inch pressure, the peas are immediately removed and allowed to cool in the air. They do not appear to soften appreciably and remain separate with very little tendency to stick together. When green peas such as Alaska peas are treated in this manner and cooled they appear unchanged except for a very slight color change. When cool the treated peas may be readily ground into flour without further drying.

The ground Alaska peas produce a flour that can be made into a pea soup by addition of water, salt and seasoning and bringing to a boil. This treated flour can be stored in unsealed polyethylene bags in the dark for periods of up to one year without the development of off flavors. However, the green flour bleaches to white in a day when exposed to sunlight.

Yellow dried raw peas can be treated in the same fashion. However since the yellow color is not much affected by cooking the treating conditions may be less critical. Dried peas of the First and Best variety (a yellow variety) have been prepared using 10–12 minutes time at pressures from 9 to 10 pounds for optimum debittering without softening.

In order to determine optimum treating conditions for desired color retention and removal of bitterness several tests have been carried out. The method is applicable to whole peas, splits, and pea flour made by grinding the raw dried peas. However when the flour is treated enough moisture condenses on it to cause it to lump which necessitates breaking up or grinding again after treating to make a smooth flour. No advantages appeared to result from making flour out of the peas before treating them to get rid of the bitterness.

The following examples of treatment will illustrate the results that have been obtained. The peas used were green raw dried peas (Alaska) and yellow raw dried peas (First and Best variety) both grown in Whitman County, Washington.

In the first tests of autoclaving it was found that when peas were subjected to the steam treatment and simply left in layers without stirring there was a great variation in results. In general the top parts of layers became browned (with almost complete destruction of the desirable natural color) before the bottom parts of the layers became debittered.

The results outlined below were obtained first by establishing a color standard for the green peas (Alaska). This was done by selecting a sample of raw dry peas having a superior color. This sample was ground and stored in a sealed container and stored in the dark. A color value of 5 was arbitrarily assigned to this standard. When part of this flour was subjected for a short time to moist steam under no pressure it became markedly greener. This color was referred to as 6. When another part of of this flour was treated with steam for 15 minutes at 15 p.s.i. it became quite brown. This color was assigned a value of 1.

Next an autoclave was fitted with a wire basket to support a pan above the bottom thereof. Water was placed in the bottom of the autoclave but the level was kept below the bottom of a pan set in the basket. A pan was partly filled with several pounds of peas and set in the basket.

The autoclave cover was fitted with a stirrer having two wide flat blades extending down to the bottom of the peas in the pan, the stirrer having a shaft extending through a steam tight seal in the cover and provided with an exterior handle for turning the shaft. The cover also had a vent valve which could be opened or closed and it had a steam pressure gauge.

A sample of five to ten pounds of raw dry peas or pea

| Variety | Condition | Pressure, p.s.i. | Time, min. | Color | Bitterness |
|---|---|---|---|---|---|
| Alaska | Flour | 0 | 20 | 6 | Bitter. |
| Do | do | 5 | 5 | 6 | Slightly bitter. |
| Do | do | 6 | 7 | 5–6 | Do. |
| Do | do | 7 | 7 | 5–6 | Debittered. |
| Do | Peas | 7 | 7 | 5 | Slightly bitter. |
| Do | do | 8 | 9 | 5 | Debittered. |
| Do | do | 8 | 10 | 5 | Do. |
| Do | do | 10 | 10 | 5 | Do. |
| Do | Flour | 15 | 15 | 1 | Do. |
| First and Best | Peas | 7 | 10 | Yellow | Slightly bitter. |
| Do | do | 8 | 10 | Yellow | Debittered. |
| Do | do | 10 | 12 | Yellow | Do. |
| Do | do | 10 | 15 | Yellow | Debittered but poor quality. |
| Do | do | 15 | 15 | Yellow | Do. | flour was placed in the pan and the autoclave, after being charged with the desired amount of water was sealed. Bottom heat was applied to create steam. Several samples of flour and peas were treated. The following table shows the results. Ten minutes deaeration and ten minutes preheat was employed in each test. The peas were agitated by turning the stirrer at a rate of 10–15 r.p.m.

The flours noted above as of poor quality make poor cooking doughs. If a thick dough of this flour plus water, salt and seasoning in appropriate quantities is extruded into hot fat the resulting noodles disintegrate. Flours made from the peas treated at lower pressures and times hold together to make fried noodles.

From the foregoing it appears that the workable pressure and time conditions for treating dried green peas (after the 10 minute deaerating and 10 minute preheat) lies in the range of 7–10 p.s.i pressure and 7–10 minutes time. The optimum results were obtained at 8 p.s.i. for 10 minutes. This assured complete debittering of whole peas and did not discolor the product to any appreciable extent.

The yellow peas are not so sensitive in color change and showed slightly more difficulty in completely debittering. Here it was found that the optimum treatment was 9–10 p.s.i. for 10 to 12 minutes.

The yellow peas debittered in accordance with our process can be made into an excellent tasty food product by combining with a small amount of wheat flour, salt, fat, and seasoning adding water to make a thick dough, extruding like spaghetti and baking. It is high in protein and the fat content can be kept very low.

It is believed to be evident from the foregoing tabulation of results that where the peas to be treated are raw dried green peas and they are to be debittered without destroying color, the range of time and pressures become quite narrow, i.e. time of the order of 8–10 minutes and pressures of the order of 7–9 p.s.i. On the other hand when color is not a factor the time and the pressure may be longer of the order of 10–12 minutes and 8–10 p.s.i. pressure.

In all treatment there must be such agitation as to permit substantially uniform application to all parts of the peas or particles of peas where they are broken up.

Having described our invention, we claim:

1. The method of debittering raw dried peas which comprises:
   removing the air from around the peas by replacing it with steam;
   raising the temperature of the peas in the presence of steam and increasing the steam pressure to about 7–10 p.s.i.; and
   holding the peas in steam at the aforesaid pressure for a period of 7–12 minutes.

2. The method of claim 1 wherein the raw dried peas are ground to fine particles before treating.

3. The method of claim 1 wherein the peas are ground to fine particles after treating.

4. The method of debittering whole or split dried raw peas which comprises:
   removing the air from around the peas by replacing it with steam;
   raising the temperature of the peas in the presence of steam to about 7–10 p.s.i. while agitating the peas; and
   holding the peas in steam at the aforesaid pressure and agitating them for a period of 7–12 minutes.

5. The method of debittering whole or split dried raw green peas which comprises:
   removing the air from around the peas by replacing it with steam;
   thereafter excluding air from the peas and increasing the steam pressure upon them to 8 p.s.i.;
   holding the peas in steam at the aforesaid pressure for a period of 10 minutes; and
   subjecting the peas to agitation throughout the time they are in the presence of steam.

6. The method of debittering whole or split yellow dried raw peas which comprises:
   removing the air from around the peas by replacing it with steam;
   thereafter excluding air from the peas and increasing the steam pressure upon them to 9 p.s.i.
   holding the peas in steam at about the aforesaid pressure for a period of 10–12 minutes; and
   subjecting the peas to agitation throughout the time they are in the presence of steam.

References Cited by the Examiner
UNITED STATES PATENTS

| | | | |
|---|---|---|---|
| 1,859,279 | 5/1932 | Chamberlain | 99—204 |
| 2,267,747 | 12/1941 | Plews | 99—98 |

A. LOUIS MONACELL, *Primary Examiner.*

RAYMOND N. JONES, *Examiner.*

M. VOET, *Assistant Examiner.*